(12) United States Patent
Craig et al.

(10) Patent No.: US 8,484,481 B2
(45) Date of Patent: Jul. 9, 2013

(54) CHIP LOCKOUT PROTECTION SCHEME FOR INTEGRATED CIRCUIT DEVICES AND INSERTION THEREOF

(75) Inventors: Jesse E. Craig, Cambridge, MA (US); Stanley B. Stanski, Essex Junction, VT (US); Scott T. Vento, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 556 days.

(21) Appl. No.: 12/764,144

(22) Filed: Apr. 21, 2010
(Under 37 CFR 1.47)

(65) Prior Publication Data
US 2011/0016326 A1    Jan. 20, 2011

Related U.S. Application Data

(60) Provisional application No. 61/225,236, filed on Jul. 14, 2009.

(51) Int. Cl.
*G06F 21/00*    (2006.01)
(52) U.S. Cl.
USPC .............. 713/183; 726/26; 726/27; 726/30; 726/34; 713/168; 713/182; 713/193; 713/194; 702/117; 708/250; 708/251; 708/252; 708/253; 708/254; 708/255; 708/256; 340/5.26; 340/5.54; 340/5.65
(58) Field of Classification Search
USPC ........................................................ 713/185
See application file for complete search history.

(56) References Cited

U.S. PATENT DOCUMENTS

| | | | |
|---|---|---|---|
| 5,206,905 A * | 4/1993 | Lee et al. ................... | 705/55 |
| 5,764,761 A | 6/1998 | Vicard | |
| 6,069,410 A | 5/2000 | Antoni et al. | |
| 6,246,970 B1 | 6/2001 | Silverbrook et al. | |
| 6,273,339 B1 | 8/2001 | Tuttle et al. | |
| 6,426,705 B1 | 7/2002 | Wischoeffer | |
| 6,735,697 B1 | 5/2004 | Buhr | |
| 6,792,528 B1 | 9/2004 | Hou | |
| 6,947,323 B2 | 9/2005 | Naso et al. | |

(Continued)

OTHER PUBLICATIONS

"SucureIT Tamper Protection for Chips", Raytheon, Nov. 1999, pp. 2, Fall Church, VA, USA.

(Continued)

*Primary Examiner* — Nathan Flynn
*Assistant Examiner* — Bryan Wright
(74) *Attorney, Agent, or Firm* — Cantor Colburn LLP; Michael LeStrange (57) ABSTRACT

A system for implementing a chip lockout protection scheme for an IC device includes an on-chip password register that stores a password externally input by a user; an on-chip security block that generates a chip unlock signal, depending on whether the externally input password matches a correct password; an on-chip false data generator; an input protection scheme configured to gate the external data inputs to functional chip circuitry upon entry of the correct password; and an output protection scheme in communication configured to steer true chip data to external outputs of the IC device upon entry of the correct password, and to steer false data generated by the false data generator to the external outputs upon entry of an incorrect password. The false generated by the false data generator is deterministic and based upon external data inputs, thereby obfuscating whether or not the correct password has been entered.

18 Claims, 5 Drawing Sheets

U.S. PATENT DOCUMENTS

| | | | |
|---|---|---|---|
| 7,069,447 B1 * | 6/2006 | Corder | 713/189 |
| 2001/0049794 A1 | 12/2001 | Chen | |
| 2003/0105980 A1 | 6/2003 | Challener et al. | |
| 2003/0154384 A1 | 8/2003 | Mueller | |
| 2004/0107353 A1 | 6/2004 | Arditti et al. | |
| 2005/0125681 A1 | 6/2005 | Bressy et al. | |
| 2005/0182948 A1 | 8/2005 | Ducharme | |
| 2005/0273623 A1 | 12/2005 | Huang et al. | |
| 2006/0242425 A1 | 10/2006 | Ishida | |
| 2010/0325046 A1 * | 12/2010 | Milne | 705/44 |

OTHER PUBLICATIONS

Oliver Kommerling et al., "Design Principles for Tamper-Resistant Smartcard Processors", Proceedings of the USENIX Workshop on Smartcard Technology, May 10-11, 1999, pp. 1-12, Chicago IL.

Kun-Wah Yip et al., "Partial-Encryption Technique for Intellectual Property Protection of FPGA-Based Products", IEEE Transactions on Consumer Electronics, Feb. 2000, pp. 183-190, vol. 46 No. 1, IEEE.

Guy-Armund Kamendje "A Tamper Resistant CMOS Crypto-Key Generation Unit", IEEE, 2002, pp. II-352-II-355.

Linda Daily Paulson, "New Chips Stop Buffer Overflow Attacks", Computer, Oct. 2004, pp. 28-30.

Wael Adi et al., "VLSI Design Exchange with Intellectual Property Protection FPGA Environment Using both Secret and Public-Key Cryptography", Proceedings of the 2006 Emerging VLSI Technologies and Architectures, 2006, pp. 7.

iTnews Australia [online]; [retrieved on Jun. 10, 2008]; retrieved from the Internet http://www.itnews.com.au/News/71553,chip-lock-aims-to-end-hardware-piracy.aspx Robert Jaques, "Chip Lock Aims to End Hardware Piracy", iTnews Australia, Mar. 7, 2008, pp. 2.

Dimitry Akselrod et al., "Platform Independent Debug Port Controller Architecture with Security Protection for Multi-Processor System-on-Chip ICs", pp. 5.

Philippe Beguin et al., "Fact Server-Aided RSA Signatures Secure Against Active Attacks", pp. 13.

Dany Nativel, "Limiting Illegal Hardware Copies by Using Secure Hardware Authentication", Amtel, pp. 24-26.

Masayoshi Taniguchi, "Memory Data Protect Method for System on Chip", Dossier JP920030239, pp. 1-3, IBM Corporation.

* cited by examiner

CHIP LOCKOUT PROTECTION SCHEME FOR INTEGRATED CIRCUIT DEVICES AND INSERTION THEREOF

BACKGROUND

The present invention relates generally to data communication security with respect to integrated circuit (IC) devices and, more particularly, to a system for implementing chip lockout protection and an insertion method thereof.

Security in data communications is a major concern in each of the military, financial, and consumer sectors. Regardless of whether such communications are facilitated through wireless networks, satellite links, smartcards, (automated teller machines (ATMs) and electronic funds transfer (EFT) transaction networks, data encryption has become a necessity. Presently, the most popular and effective encryption algorithms are too computationally expensive to be implemented as software when used in embedded devices as the cost, size, and power consumption of a high-speed, general purpose processor needed for executing the algorithms is too great. Instead, hardware based custom solutions are used.

In addition, the concept of obfuscation (also referred to in the cryptographic and computer security arts as "security through obscurity") is often relied upon along with these encryption algorithms as a means of enhancing the security benefits. This somewhat controversial technique is intended to hide the implementation of the encryption algorithm from both users and potential attackers. In other words, a system relying on security through obscurity may have theoretical or actual security vulnerabilities, but its owners or designers believe that the flaws are not known, and that attackers are unlikely to find them. However, obfuscation can be difficult to ensure in hardware-based implementations due to the many techniques available for reverse engineering IP designs.

Other existing chip protection solutions utilize a simple, password based lockout mechanism in which a password is inputted to a security circuit, which in turn outputs an enable bit whenever the correct password is detected. Using the state of this enable bit, the security circuit provides a method of disabling the protected circuit. However, this feature does not prevent or provide protection from password "cracking" techniques. Accordingly, there is a need for a hardware developer to be able to protect the IP in a hardware design in an automated fashion that does not significantly impact performance, die size, power consumption, or testability of the device. Moreover, given a fixed length password, there is also a need for preventing or limiting the ability of an attacker to determine the password using high speed, automated trial and error techniques.

SUMMARY

A system for implementing a chip lockout protection scheme for an integrated circuit (IC) device includes, in an exemplary embodiment, an on-chip password register that stores a password externally input by a user; an on-chip security block in communication with the password register, the security block configured to generate a chip unlock signal, the value of which depends on whether the externally input password by the user matches a correct password for the IC device; an on-chip false data generator in communication with external data inputs to the IC device; an input protection scheme in communication with the chip unlock signal, the input protection scheme configured to gate the external data inputs to functional chip circuitry upon entry of the correct password; and an output protection scheme in communication with the false data generator and the chip unlock signal, the output protection scheme configured to steer true chip data to external outputs of the IC device upon entry of the correct password, and to steer false data generated by the false data generator to the external outputs of the IC device upon entry of an incorrect password; wherein the false data generated by the false data generator is deterministic and based upon external data inputs to the IC device, thereby obfuscating whether the user has actually entered the correct password or not.

In another embodiment, a method for implementing a chip lockout protection scheme for an integrated circuit (IC) device includes inserting an on-chip password register that stores a password externally input by a user; inserting an on-chip security block in communication with the password register, the security block configured to generate a chip unlock signal, the value of which depends on whether the externally input password by the user matches a correct password for the IC device; inserting an on-chip false data generator in communication with external data inputs to the IC device; inserting an input protection scheme in communication with the chip unlock signal, the input protection scheme configured to gate the external data inputs to functional chip circuitry upon entry of the correct password; and inserting an output protection scheme in communication with the false data generator and the chip unlock signal, the output protection scheme configured to steer true chip data to external outputs of the IC device upon entry of the correct password, and to steer false data generated by the false data generator to the external outputs of the IC device upon entry of an incorrect password; wherein the false data generated by the false data generator is deterministic and based upon external data inputs to the IC device, thereby obfuscating whether the user has actually entered the correct password or not.

BRIEF DESCRIPTION OF THE DRAWINGS

Referring to the exemplary drawings wherein like elements are numbered alike in the several Figures.

DETAILED DESCRIPTION

Disclosed herein is a system for implementing chip lockout protection and an insertion method thereof. Briefly stated, the invention embodiments presented herein prevent an attacker from cracking the password of a chip, while also supporting manufacturing testing and automating the insertion of such protection logic. To this end, three basic system blocks are utilized: a password register that stores a password entered by the user, a false data generator, and a security block. The false data generator creates a deterministic stream of false data based on the inputs to the chip, while the security block compares the user entered password and determines whether the chip should be unlocked or not. The security block further generates a "chip unlock" signal based on the password comparison, with the chip unlock signal being used to control special gating logic. The gating logic function includes selection (e.g., through multiplexers) of the true or false data from leaving or entering the chip, as well as whether the real scan path is exercised by manufacturing test or whether an added false scan path is exercised.

In order to prevent an attacker from successfully cracking the password associated with an IC chip, the chip should not allow for the following conditions/results when an incorrect password is used: generating obviously false data on output ports (e.g., all 0's or all 1's); generating a data output that is not related to the data input; generating obviously false scan data on scan-out ports during scan (e.g., the identity rule of scan-chain not holding); generating non-repeatable data on output ports (e.g., random data coming out on output ports when the data should be deterministic). Moreover, when the correct password is entered, there should not be a significant change in power consumption of the chip (e.g., the correct password controls the power-on of a voltage island).

Figure 1:
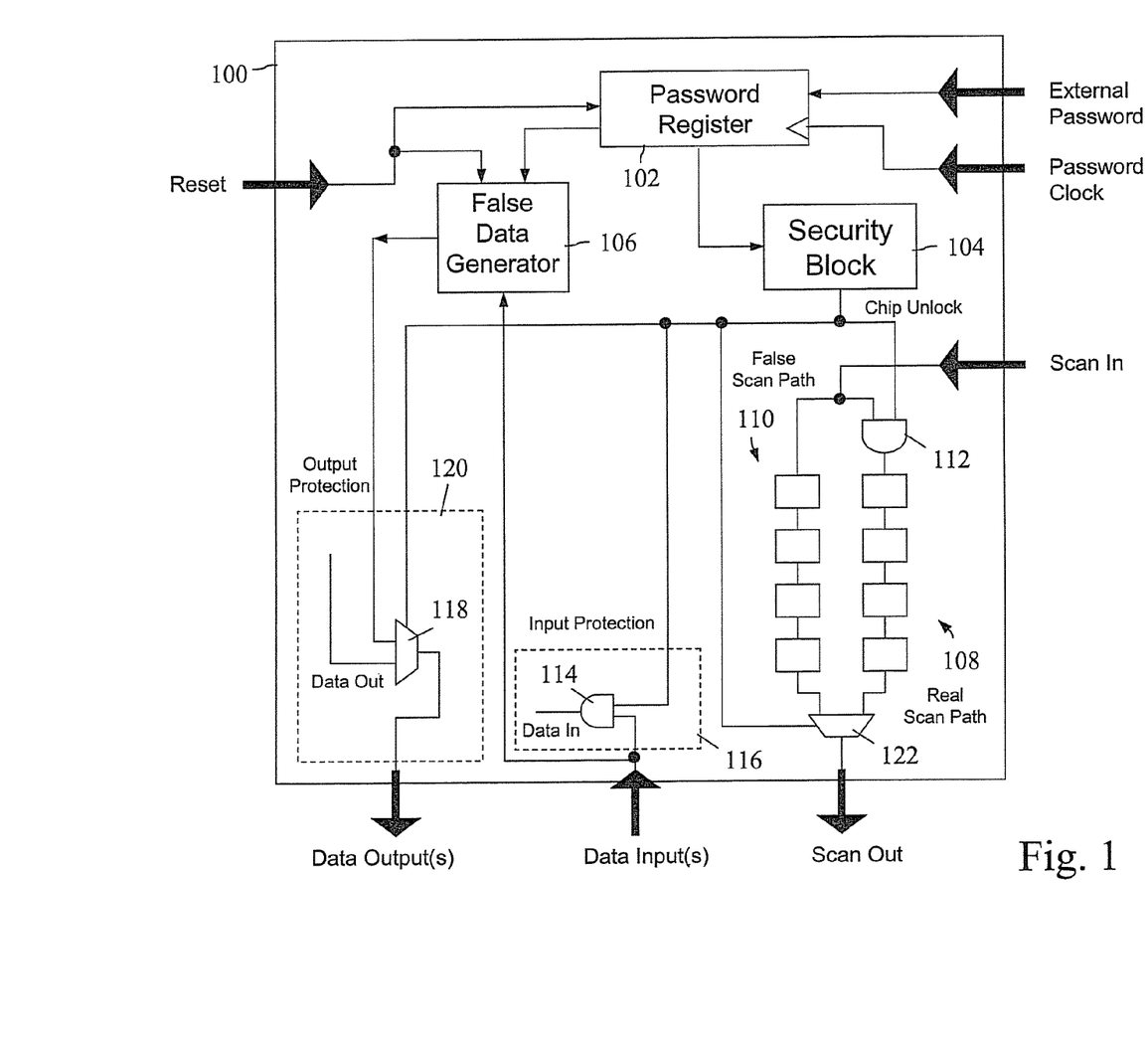
FIG. 1 is a schematic block diagram of an integrated circuit chip configured with chip lockout protection, in accordance with an embodiment of the invention.

Referring initially to FIG. 1, there is shown a schematic block diagram of an integrated circuit chip 100 configured with chip lockout protection, in accordance with an embodiment of the invention. As is shown, the chip (in addition to the actual functional logic/devices of the chip that are not depicted) includes a password register 102 that stores a password externally entered by a user, a security block 104 that determines whether the chip 100 should be unlocked or not, based on the whether the correct password is externally entered, and a false data generator 106 that is used to obfuscate whether the correct password has been entered or not by generating deterministic stream of false data based on the inputs to the chip 100. In addition, for manufacturing testing purposes, the chip 100 has both a real scan chain path 108, as well as a false scan chain path 110. Data input into the beginning of the real scan chain path 108 is gated by AND gate 112. Various inputs to and outputs from the chip are indicated by the darkened arrows in FIG. 1 including, for example, Data Input(s), Data Output(s), Scan In, Scan Out, Reset, External Password and Password Clock.

In operation, an externally input password from a user is stored in the password register 102. Optionally, the storing of an input password to the password register may be clocked by a signal on the Password Clock input to the chip 100. In addition, a Reset input signal may be used to clear the password register 102, with such a signal also being used by the deterministic false data generator 106. Assuming first that a correct password is input, then the chip 100 acts as normally programmed to (albeit transparent to a hacker). That is, the security block 104 determines that the correct password has been input and thus outputs an internal "Chip Unlock" signal having a logical high value. With respect to data input to the chip, the Chip Unlock signal is used to gate the externally input data to the internal chip logic (not shown), as reflected by the AND gate 114 depicted in the dashed block 116 labeled "Input Protection" in FIG. 1. Of course, it will be appreciated that the chip 100 in actuality would have several such gated inputs.

Similarly, the Chip Unlock signal is also used as a control input to a multiplexing device 118 in the "Output Protection" block 120 of FIG. 1, which effectively selects whether the data output from the chip is the real chip output data or the false output data generated by the false data generator 106. Again, in the case of a password match, the Chip Unlock signal would operate to select the real chip output data. Still another use of the Chip Unlock signal is to act as a control input to another multiplexing device 122, which selects whether the Scan Out output of the chip 100 passes scan data from the real scan chain path 108 or the false scan chain path 110. In the case of a password match, the Chip Unlock signal would operate to select the real chip output data.

Conversely, in the event an incorrect password is entered into the password register 102, the security block 104 will output a logic low value for the Chip Unlock signal. In this instance, the gating and multiplexing functions described above will prevent externally input data from reaching the chip logic, prevent real chip data from leaving the chip, and prevent scan in data from propagating through the real scan path. Moreover, the multiplexing functions of devices 118, 122 will respectively steer false data from the false data generator 106 to the Data Output(s) of the chip, and will select scan test data passed through the false scan path 110 to be passed to the Scan Out pin(s) of the chip 100.

Figure 2:
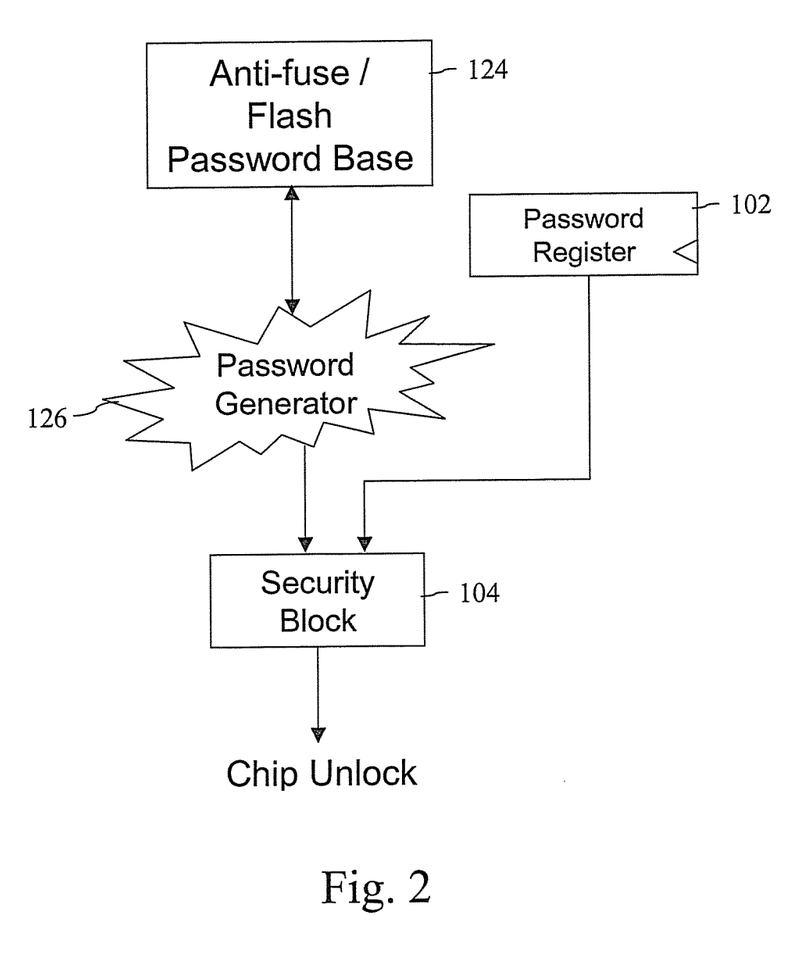
FIG. 2 is a schematic diagram of an exemplary internal password generating mechanism for the integrated circuit chip of FIG. 1.

Referring now to FIG. 2, there is shown a schematic diagram of an exemplary internal password generating mechanism that may be used in conjunction with the password register 102 and security block 104 of the chip 100 depicted in FIG. 1. A non-volatile password storage device 124 (e.g., anti-fuse, flash memory) is used to store one or more passwords therein, while a password generator 126 generates a "correct" password value. This may be, for example, a simple pass-through function with respect to the value(s) stored in the password storage device 124, or the password generator 126 can incorporate a password rotation scheme such as S/KEY. The "correct" password value generated by the password generator 126 is compared by the security block 104 to the user input value in the password register. If there is a match, the value of the Chip Unlock output signal is high; otherwise, the output is of Chip Unlock is low.

Figure 3:
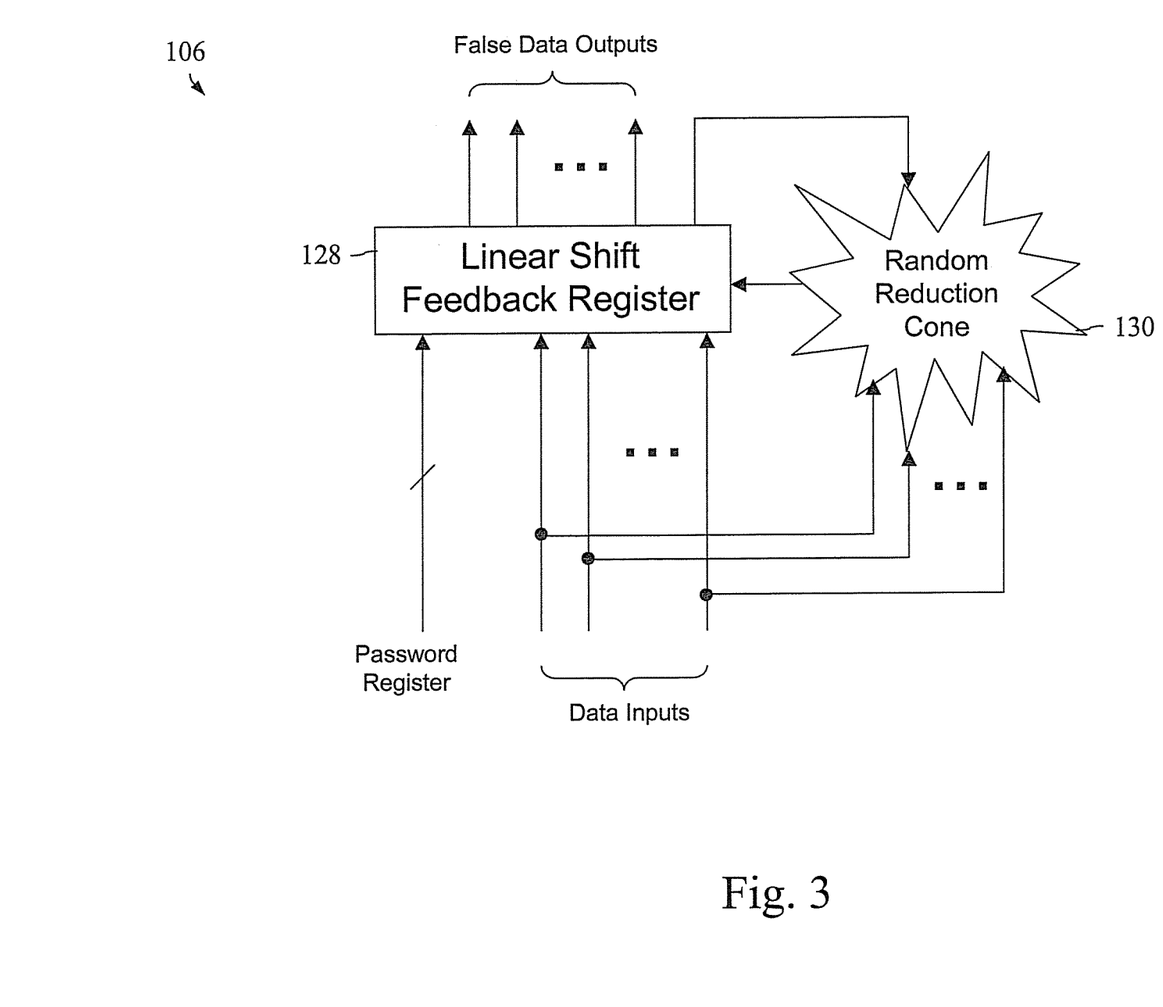
FIG. 3 is a schematic diagram of an exemplary false data generator used in the integrated circuit of FIG. 1.

As indicated above, in order to obfuscate the condition of whether a correct password has been generated or not, the false data generator creates a deterministic stream of false data based on the inputs. As shown in FIG. 3, one possible implementation for such a false data generator 106 may be a linear shift feedback register (LFSR) 128. The LFSR 128 is initialized based on all of the data inputs thereto, which are also input to a random reduction logic cone 130. With each cycle, the result of the reduction of the data inputs by reduction cone 130 is shifted into the LFSR 128. The outputs of LFSR represent the deterministic false data outputs that are steered to the outputs pins of the chip in the event an incorrect password has been entered. Furthermore, in order to maintain obfuscation, the contents of the password register are also used by the false data generator 106. In that manner, the false generator 106 can still generate false data output that is consistent with respect to the input data, but also unique from incorrect password to incorrect password. In other words, if the false data output data is consistent with the input data for each possible incorrect password, then a hacker can determine that two or more passwords that generate the same output data from the same input data must both, by definition, be incorrect.

Figure 4:
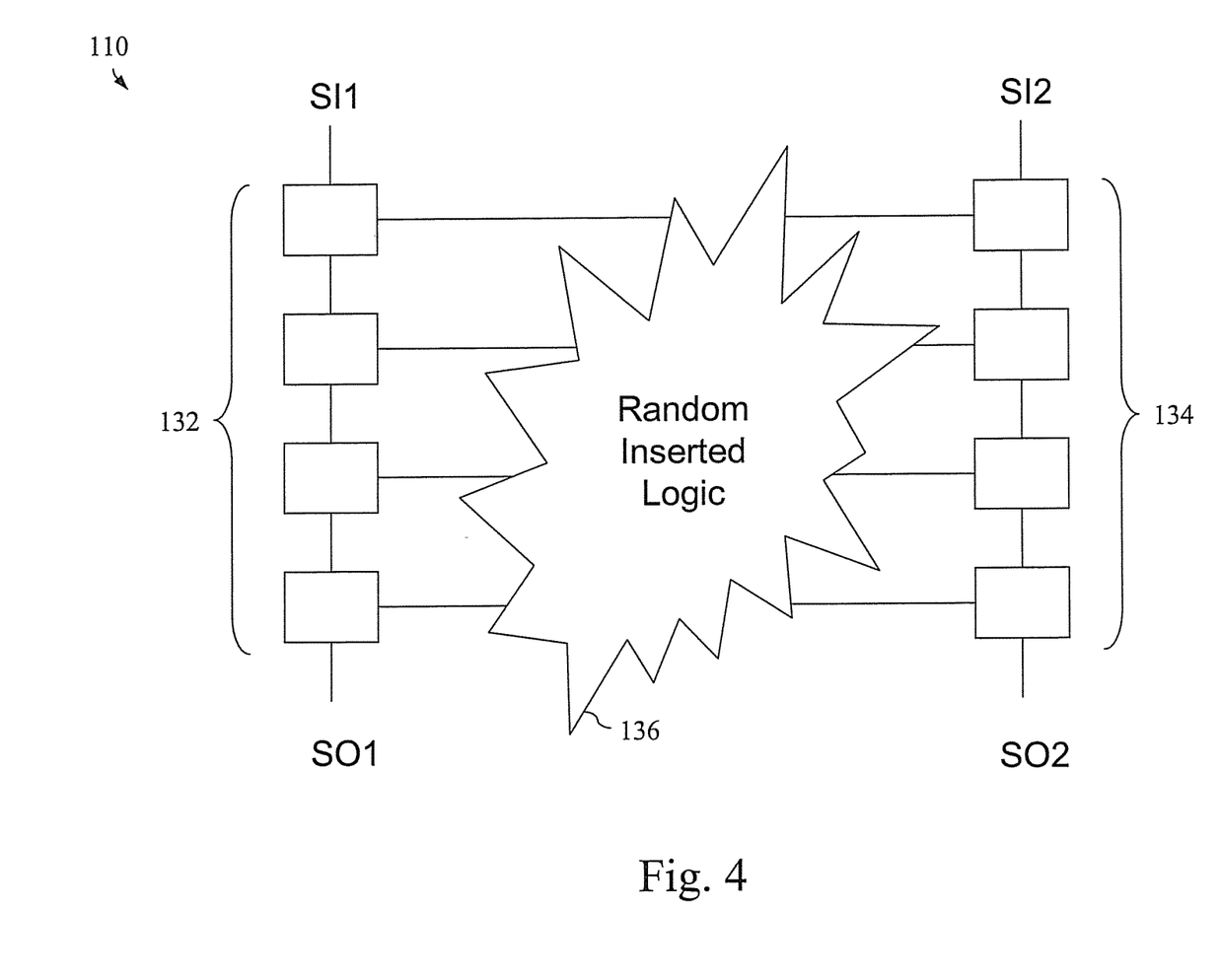
FIG. 4 is schematic diagram illustrating the operation of the false scan path shown in FIG. 1.

Referring next to FIG. 4, there is shown a more detailed schematic view illustrating the operation of the false scan path 110 shown in FIG. 1. Again, the correct password enables the real scan path for test, while an incorrect password enables the false scan path for test. In a practical chip, there may be several scan chains in parallel. Thus, the false scan path 110 in FIG. 4 illustrates a first scan chain 132 (with input SI1 and output SO1) in parallel with a second scan chain 134 (with input SI2 and output SO2). As also shown in FIG. 4, random logic 136 is inserted between the first scan chain 132 and the second scan chain 134, so as to mimic the "real"

logic being tested. However, the random inserted logic should not be equivalent to the logic that would be included in the real scan chains.

Figure 5:
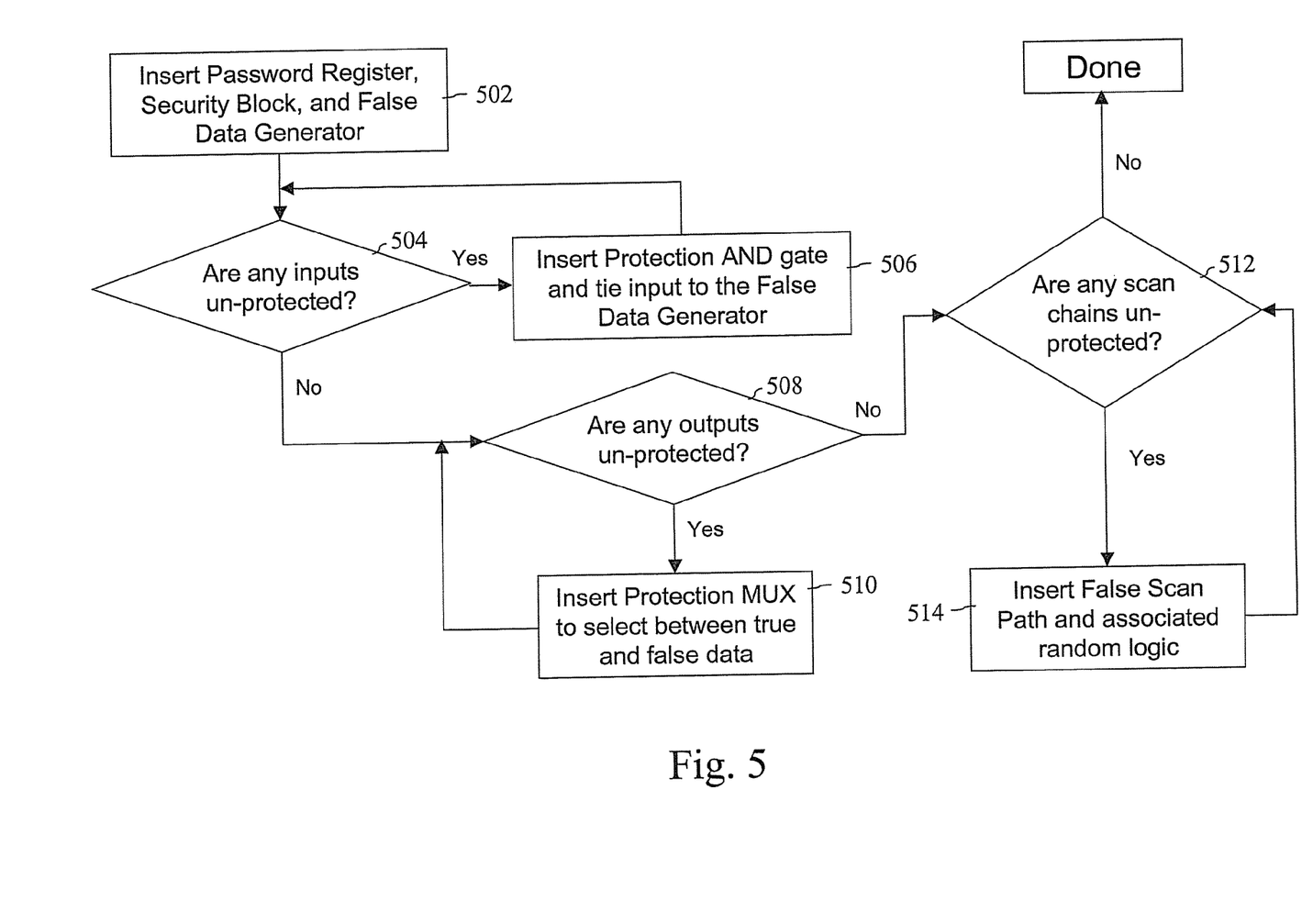
FIG. 5 is a flow diagram of an automated method for inserting the password register, false data generator, security block, false scan paths, and gating logic, in accordance with a further embodiment of the invention.

Finally, FIG. 5 is a flow diagram of an automated method 500 for inserting the password register, false data generator, security block, false scan paths, and gating logic, in accordance with a further embodiment of the invention. Method 500 works in a similar manner with respect to modern test logic insertion methods and is design independent, allowing it to work on any digital IP design. The inserted logic is relatively small so there is no significant impact to the die's size. The password logic also does not actively switch during the unlocked use of the protected IP and thus does not impact the power consumption significantly. Only one multiplexer is added to the primary input and output paths minimizing the inventions effect on performance. The invention also supports scan based testing without opening a vulnerability to attackers.

As specifically shown in block 502, the password register, security block and false data generator are inserted. At decision block 504, if any inputs to the chip are left unprotected, then a protection AND gate (e.g., gate 114 of FIG. 1) is inserted between the external Data Input pins and the chip's functional circuitry as indicated at block 506. The un-gated inputs are also tied to the false data generator as described above. Upon completely protecting the chip inputs, method proceeds to decision block 508 see whether all chip Data Output pins have been protected. If any such outputs are left unprotected, then a protection multiplexer (e.g., multiplexer 118 of FIG. 1) is inserted for selection between the real output data and the deterministic false data, as shown in block 510. Proceeding to decision block 512, so long as there are any scan chains unprotected, the method 500 proceeds to block 514 to insert a false scan path (e.g., path 110 and random logic 136 FIGS. 1, 4).

As will thus be appreciated from above, given a fixed length password, the invention embodiments discussed herein prevent or limit the ability of an attacker to determine the password using high speed, automated, trial and error techniques. First, the false data generator prevents against producing obviously false data (e.g., all 0's or 1's) on output ports when an incorrect password is used. Moreover, since the chip input data is also sent to the false data generator, the false data that is output from the chip when the password is incorrect (though false) is still related to the data input and repeatable, thus making it deterministic. By also coupling the password register to the false data generator, each unique but incorrect password can also have the same consistent, but false output data associated therewith. The same also holds true for producing obviously false scan data on scan-out ports during scan. That is, since the false scan path is designed to mimic the real scan path without exposing the details of the chip's logic the scan-out ports will produce seemingly correct data.

In addition, certain features are also avoided so as to prevent the determination that an incorrect password has been entered. For example, there is not a significant change in power consumption when the correct password is entered, such as by having the password control the power-on of a voltage island. Thus, by not gating the power of the protected IP with the Chip Unlock signal, normal power consumption will occur.

Further, in view of the above, the present invention embodiments address the shortcomings of existing security techniques by not only protecting the chip from attackers but by also providing an automated way to insert protection logic and without impairing the testability of the design.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for implementing a chip lockout protection scheme for an integrated circuit (IC) device, comprising:
    an on-chip password register that stores a password externally input by a user;
    an on-chip security block in communication with the password register, the security block configured to generate a chip unlock signal, the value of which depends on whether the externally input password by the user matches a correct password for the IC device;
    an on-chip false data generator in communication with external data inputs to the IC device;
    an input protection scheme in communication with the chip unlock signal, the input protection scheme configured to gate the external data inputs to functional chip circuitry upon entry of the correct password;
    an output protection scheme in communication with the false data generator and the chip unlock signal, the output protection scheme configured to steer true chip data to external outputs of the IC device upon entry of the correct password, and to steer false data generated by the false data generator to the external outputs of the IC device upon entry of an incorrect password;
    wherein the false data generated by the false data generator is deterministic and based upon external data inputs to the IC device, thereby obfuscating whether the user has actually entered the correct password or not;
    an on-chip false scan test path, in addition to a real scan test path;
    wherein external scan-in test data is gated to the real scan test path by the chip unlock signal upon entry of the correct password, the external scan-in test data also coupled directly to the false scan test path; and
    a multiplexing device controlled by the chip unlock signal, the multiplexing device configured to steer data from the real scan test path to an external scan-out output of the IC device upon entry of the correct password, and configured to steer test data from the false scan test path to the external scan-out output of the IC device upon entry of an incorrect password.

2. The system of claim 1, further comprising random inserted logic between parallel scan chains included within the false scan test path, wherein the random inserted logic is not equivalent to logic included within the real scan test path.

3. The system of claim 1, further comprising a non-volatile password storage device in communication with the security block, the non-volatile password device containing one or more correct passwords for the IC device.

4. The system of claim 3, further comprising a password generator in communication with the password storage device and the security block, the password generator configured to generate the one or more passwords for the IC device.

5. The system of claim 4, wherein the password generator employs a password rotation scheme.

6. The system of claim 1, wherein the false data generator further comprises a linear shift feedback register (LFSR).

7. The system of claim 6, wherein the false data generator further comprises a random reduction logic cone coupled to the external data inputs, the random reduction logic cone configured to shift a reduction of the external data inputs into the LFSR.

8. The system of claim 7, wherein the false data generator is in communication with the password register.

9. The system of claim 8, wherein the false data generator generates unique but deterministic false data for different incorrect passwords.

10. A method for implementing a chip lockout protection scheme for an integrated circuit (IC) device, the method comprising:
   inserting an on-chip password register that stores a password externally input by a user;
   inserting an on-chip security block in communication with the password register, the security block configured to generate a chip unlock signal, the value of which depends on whether the externally input password by the user matches a correct password for the IC device;
   inserting an on-chip false data generator in communication with external data inputs to the IC device;
   inserting an input protection scheme in communication with the chip unlock signal, the input protection scheme configured to gate the external data inputs to functional chip circuitry upon entry of the correct password;
   inserting an output protection scheme in communication with the false data generator and the chip unlock signal, the output protection scheme configured to steer true chip data to external outputs of the IC device upon entry of the correct password, and to steer false data generated by the false data generator to the external outputs of the IC device upon entry of an incorrect password;
   wherein the false data generated by the false data generator is deterministic and based upon external data inputs to the IC device, thereby obfuscating whether the user has actually entered the correct password or not; inserting an on-chip false scan test path, in addition to a real scan test path;
   wherein external scan-in test data is gated to the real scan test path by the chip unlock signal upon entry of the correct password, the external scan-in test data also coupled directly to the false scan test path; and
   inserting a multiplexing device controlled by the chip unlock signal, the multiplexing device configured to steer test data from the real scan test path to an external scan-out output of the IC device upon entry of the correct password, and configured to steer test data from the false scan test path to the external scan-out output of the IC device upon entry of an incorrect password.

11. The method of claim 10, further comprising inserting random logic between parallel scan chains included within the false scan test path, wherein the random inserted logic is not equivalent to logic included within the real scan test path.

12. The method of claim 10, further comprising inserting a non-volatile password storage device in communication with the security block, the non-volatile password device containing one or more correct passwords for the IC device.

13. The method of claim 12, further comprising inserting a password generator in communication with the password storage device and the security block, the password generator configured to generate the one or more passwords for the IC device.

14. The method of claim 13, wherein the password generator employs a password rotation scheme.

15. The method of claim 10, wherein the false data generator further comprises a linear shift feedback register (LFSR).

16. The method of claim 15, wherein the false data generator further comprises a random reduction logic cone coupled to the external data inputs, the random reduction logic cone configured to shift a reduction of the external data inputs into the LFSR.

17. The method of claim 16, wherein the false data generator is in communication with the password register.

18. The method of claim 17, wherein the false data generator generates unique but deterministic false data for different incorrect passwords.

* * * * *